Aug. 2, 1966           L. D. ZEPERNICK          3,263,768
DETACHABLE MOUNT FOR MAGNETOSTRICTIVE DETECTOR
Filed July 2, 1962                           2 Sheets-Sheet 2
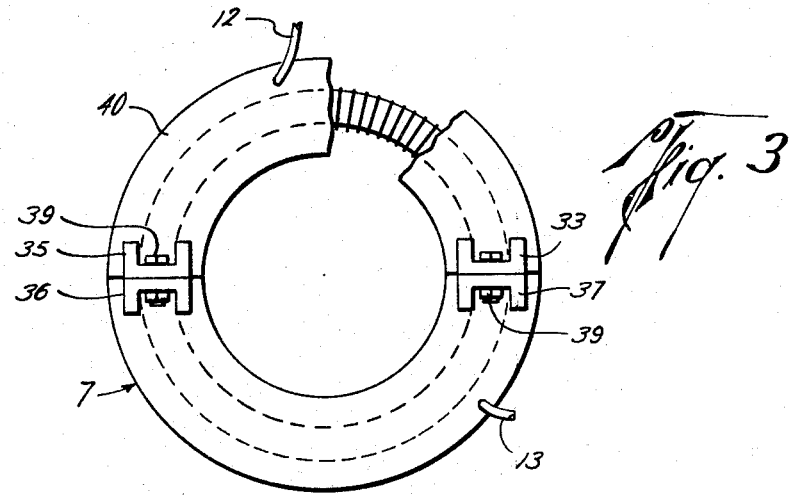
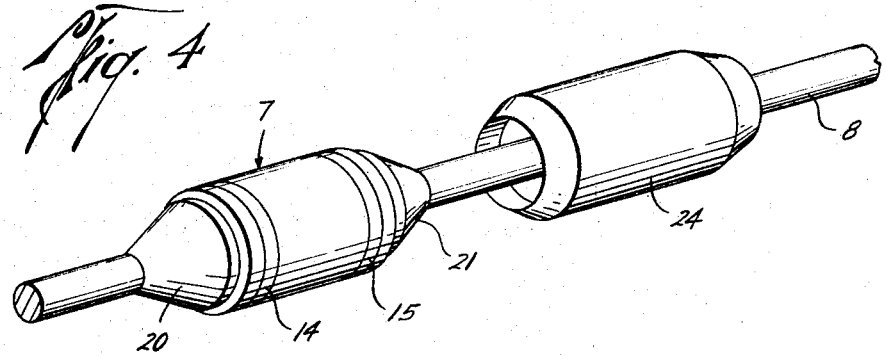
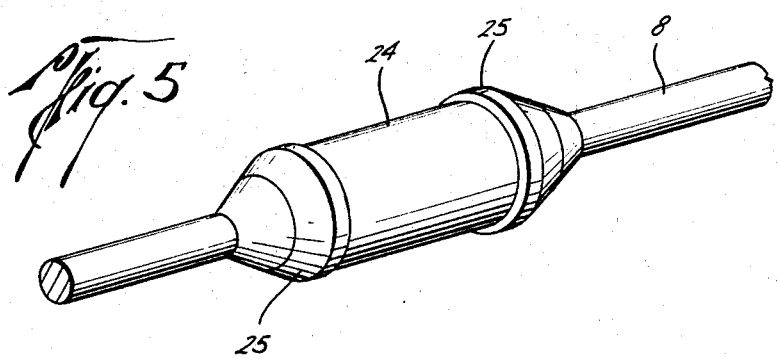
Lawrence D. Zepernick
INVENTOR.
BY Bertram H. Mann
ATTORNEY United States Patent Office 3,263,768
Patented August 2, 1966

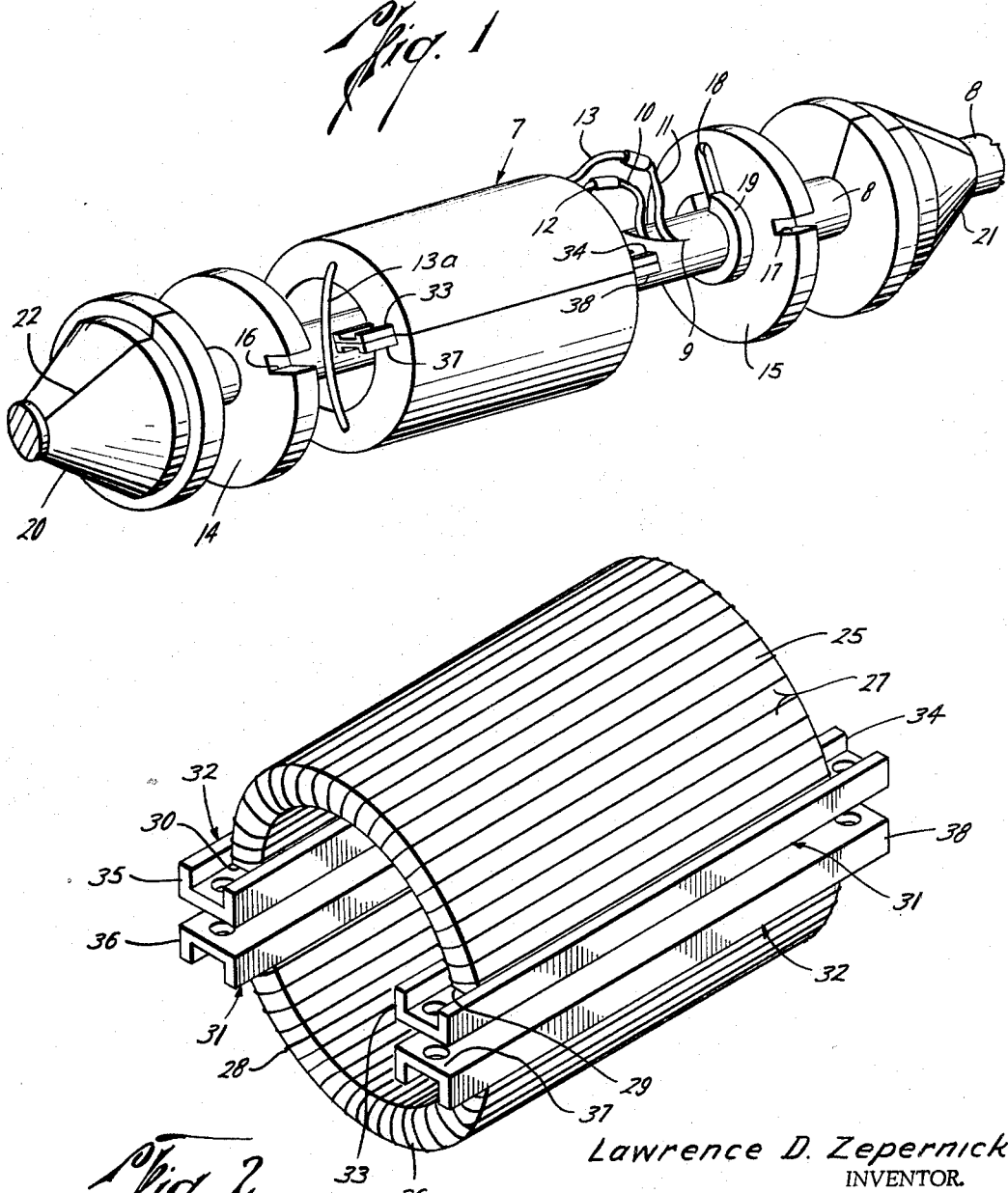

3,263,768
DETACHABLE MOUNT FOR MAGNETO-
STRICTIVE DETECTOR
Lawrence D. Zepernick, Houston, Tex., assignor, by mesne assignments, to Vector Cable Company, Houston, Tex., a corporation of Texas
Filed July 2, 1962, Ser. No. 206,776
6 Claims. (Cl. 181—.5)

This invention relates to means for mounting electrical instruments, such as magnetostrictive transducers, upon signal-transmitting electrical cables.

In seismograph operations it is frequently necessary to suspend at various depths within a bore hole in the earth, transducer devices which detect pressure or seismic waves transmitted from remote radiating equipment. The pressure wave is initiated by an explosion or other wave radiating means in a well bore or from a location at the surface of the earth. The responses of the transducers are correlated in a recording instrument with signals from the radiating means in determining travel times and various characteristics of earth formations.

Where the detecting transducer is of the cylindrical magnetostrictive type, it has been customary to apply the device over the ends of the suspending cable or other conductor and to permanently mount the device with suitable sealing and insulating materials upon the conductor adjacent the wire ends to which it is connected. In this arrangement, if one of the transducers is found to be defective, there is no convenient way to repair or replace it, short of cutting out the defective transducer, splicing the cable, and affixing a replacement instrument.

Accordingly, an object of the present invention is to provide a magnetostrictive transducer which may be detachably mounted upon an electric cable to permit expeditious removal thereof and replacement, if necessary.

Another object is to provide a sealed protective casing and conductor mount for a magnetostrictive transducer which may be readily disassembled to expose the transducer for inspection, repair, and replacement.

These objects and others are attained in the device herein disclosed which consists in general of a magnetostrictive transducer formed of half cylinder shaped cores about which wires are longitudinally wrapped. Attaching plate members, conveniently of U-section, are applied to each of the side edge faces of the core members and the assemblies then encased in suitable plastic material, such as an epoxy resin. The attaching elements project longitudinally beyond the core halves and may be utilized in bolting the halves about a cable adjacent the ends of wires to which the transducer is to be connected. The entire instrument is encased within a protective cylinder or boot which is secured at its ends to end wall members. While the end wall members, preferably, are sealingly secured both to the cable and the encasing cylinder, as by molding, these elements may be disassembled, as by the application of heat, to expose the transducer element. In turn, the transducer may be unbolted from the conductor, disconnected from the wire ends, and replaced.

In the accompanying drawings,

FIG. 1 is an exploded perspective view of the transducer and a portion of the protective casing mounted upon an electric cable;

FIG. 2 is an enlarged, disassembled perspective showing the magnetostrictive transducer in the process of manufacture;

FIG. 3 is an end view of the finished transducer, a portion of the insulation being broken away;

FIG. 4 is a perspective view showing the protective casing sleeve or boot being applied to the instrument; and FIG. 5 is a perspective view of the mounted and encased transducer.

In FIG. 1 there is shown a generally cylindrical magnetostrictive transducer, generally designated 7, received upon multi-conductor electric cable 8. The cable sheath is cut as at 9, adjacent the transducer and two ends of interior insulated wires 10 and 11 drawn out through the cut. These wire ends are shown spliced to the pigtails 12 and 13 projecting from the transducer for electrically connecting the transducer in the desired cable circuit.

At each end of transducer 7 there is provided a circular end baffle member 14 or 15, having peripheral slots or recesses 16 or 17 for a purpose to be described. Members 14 and 15 also have recesses, as 18, in their inner faces and are centrally apertured and provided with collars 19 which are slidable on cable 8. Beyond members 14 and 15, frusto-conical end wall members 20 and 21 are also received upon cable 8. These latter members, conveniently, may be split, as represented at 22, for easy assembly about and sealing attachment to the cable.

The magnetostrictive transducer 7, shown in intermediate stage and enlarged in FIG. 2, includes a pair of identical, semi-cylindrical core members 25 and 26 about which are longitudinally wound electrical wires 27 and 28 having the desired number of turns and compactness. Members 25 and 26 may be formed by sawing in half a cylinder of proper magnetostrictive material by means of a diamond cutting wheel.

Mounted upon each of the cut, longitudinal, side edge faces 29 and 30 of core halves 25 and 26 is an attaching plate member 31 or 32, conveniently of U-section, and made of ferromagnetic material, such as soft steel. These members have elements 33–38 which project longitudinally beyond the cores and are perforated as shown for receiving bolts or other attaching elements, as at 39 (FIG. 3).

Each of the cylindrical halves 25 and 26 is then encased in suitable insulating and protective material, such as epoxy resin, as at 40 in FIG. 3. The completed, semi-cylindrical halves may then be applied at any desired position along a cable, bolted together and the wires connected to wire ends, as 10 and 11 in FIG. 1. The opposite ends of the transducer halves are jumpered, as at 13a. The manner of winding the transducer and of its electrical connection into the transmitting circuit are well known and need not be further detailed here. After flange elements 33–38 are properly secured together, the circular end baffle pieces 14 and 15 are slid against the opposite ends of the transducer cylinder, peripheral recesses 16 and 17 snugly receiving the flange elements. Inner face recesses 18 accommodate electrical connections 12 and 13. These baffle members serve to support transducer 7 upon the cable.

Next, the half-conical end wall members 20 and 21 are assembled against baffle elements 14 and 15, as shown in FIG. 4, and sealingly secured to the cable sheath, as with the use of a molding iron. Finally, the protective boot or sleeve 24 is slid over the transducer and end wall assembly and sealingly secured to end wall members 20 and 21, as by means of shaped rings 40. The compact, sealed, fully protected construction of FIG. 5 results.

If it is desired to expose and/or remove the transducer, it is first necessary to unseal end wall ring elements 40, and then loosen the halves of conical end wall members 20 and 21, as with the use of heat, or cutting if necessary. Then, boot 24 may be slid longitudinally and end baffles 14 and 15 separated from the transducer cylinder. Ultimately, attaching elements 39 may be removed from bolting flanges 33–38 and electrical connections 10, 11, 12 and 13 broken, to permit removal of the instrument. A new instrument can be positioned and connected in the same manner as that in which the original assembly was made, new protective case members being supplied, if necessary.

It is intended that the above serve as a complete description of the manner of assembly and disassembly of the magnetostrictive transducer with cable or other conductor means. The result is a firmly mounted, sealed, readily detachable transducer of the magnetostrictive type.

Various features of the invention may be modified as will occur to those skilled in the art and the exclusive use of all modifications as come within the scope of the appended claims is contemplated.

I claim:

1. In combination with a continuous cable having projecting wire ends along its length, a longitudinally-split, cylindrical transducer device encompassing the cable adjacent said wire ends and connected thereto, baffle members slidably mounted on said cable and engaging the ends of said device for supporting the device on the cable, and protective casing means including end wall members lodged upon the cable outwardly of said baffle members and a cylindrical boot encompassing said device and detachably secured to said end wall members.

2. In combination with a continuous electrical cable having exposed wire ends along its length, a cylindrical transducer device received about the cable and connected with said exposed wire ends, said device being split longitudinally to form generally semi-cylindrical portions with abutting faces for securing said portions together, circular baffle elements in slidable contact with the cable and abutting the ends of said device to support said device concentrically about said cable where said wire ends are exposed, and protective end and peripheral casing members received about said device and securing the same to the cable, said end casing members being separable from said peripheral casing member to permit withdrawal of said peripheral casing member and access to the secured abutting faces for separation of said split portions of said device from the cable.

3. In combination with a continuous electrical cable having projecting wire ends along its length, a cylindrical magnetostrictive transducer device received about the cable, said device being split longitudinally to form generally semi-cylindrical portions with abutting faces, securing means including elements projecting longitudinally from said faces, circular baffle elements disposed about and in slidable contact with the cable and abutting the ends of said device, said elements being notched for accommodating said flange elements, and protective end and peripheral casing members detachably received about said device and securing the same to the cable.

4. The combination described in claim 3 in which said end casing members are in slidable contact with the cable and support said device upon the cable.

5. In combination with a continuous length of cable having conductors therein and conductor ends exposed along the length of said cable, a cylindrical transducer device concentrically received about said cable along its continuous length and connected to said conductor ends, circular supports slidable along the surface of said cable and engageable with the ends of said device to support said device about said cable, and encasing means including end and peripheral casing members detachably received about said device to permit separation of said encasing means while said device is received about said cable.

6. In combination with a continuous cable having exposed conductor ends along its length, a cylindrical transducer device mounted about the continuous cable in a coaxial relationship, and cylindrical transducer device being constructed to permit its removal from about said cable without severing said cable, baffle elements in slidable contact with the outer surface of said cable and abutting the ends of said device to support said device about said cable in said coaxial relationship, and protective end and peripheral casing members received about said device, said end casing members also being slidable along the surface of said cable and separable from said peripheral casing member to permit withdrawal of said peripheral casing member and access to the device on said cable.

References Cited by the Examiner

UNITED STATES PATENTS

| 2,191,121 | 2/1940 | Slichter | 181—.5 |
| 2,551,417 | 5/1951 | Carlisle | 340—7 |
| 2,592,780 | 4/1952 | Woods | 181—.5 |
| 2,864,073 | 12/1958 | Harris | 340—11 |
| 2,920,307 | 1/1960 | Chernosky | 340—13 |
| 2,923,915 | 2/1960 | Vogel | 340—17 |

BENJAMIN A. BORCHELT, *Primary Examiner.*

CHESTER L. JUSTUS, *Examiner.*

J. W. MILLS, W. KUJAWA, *Assistant Examiners.*